May 30, 1933. W. HARPER, JR 1,911,567
AIRCRAFT PROPULSION
Filed March 1, 1930 2 Sheets-Sheet 1
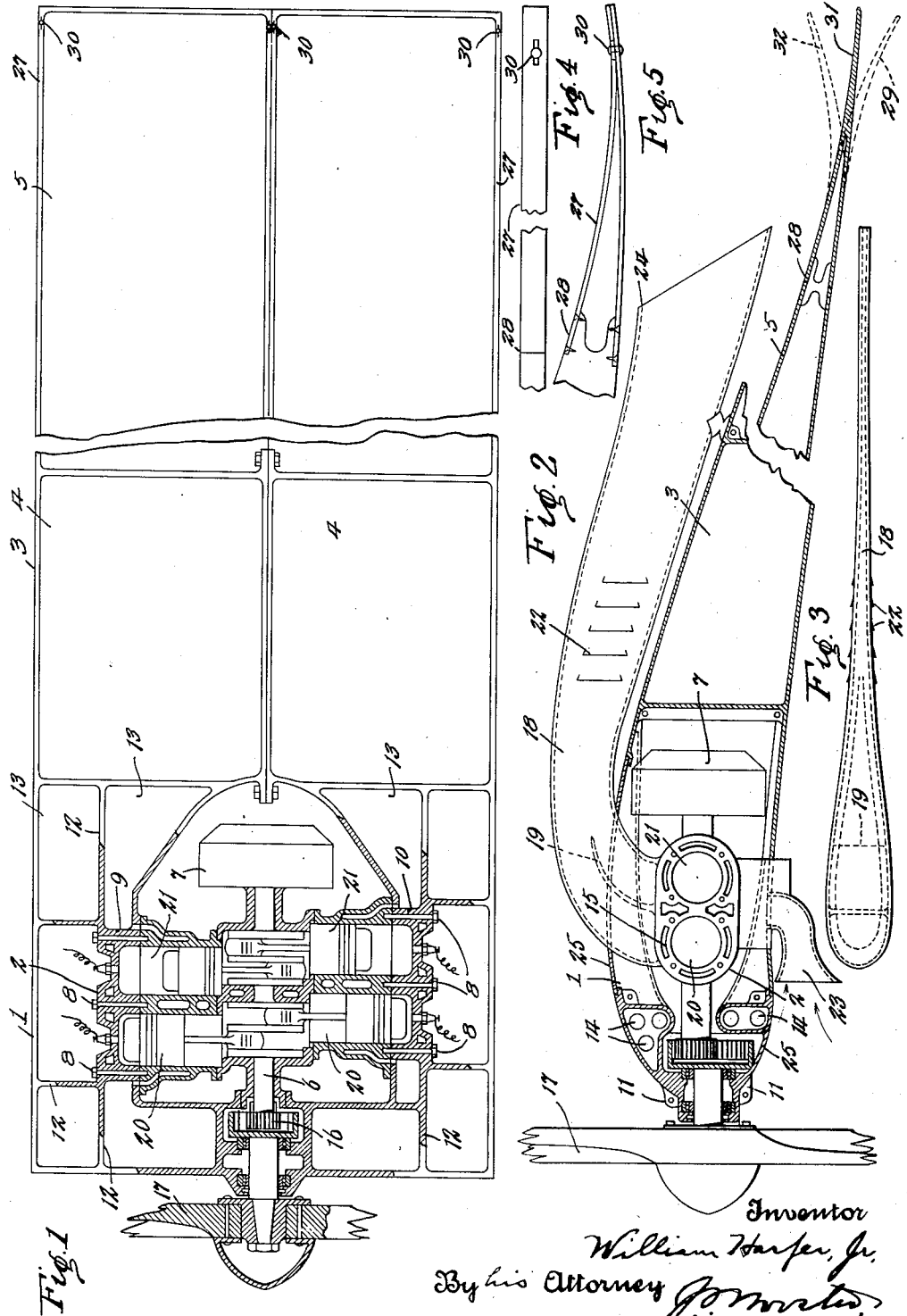

May 30, 1933.  W. HARPER, JR  1,911,567
AIRCRAFT PROPULSION
Filed March 1, 1930  2 Sheets-Sheet 2
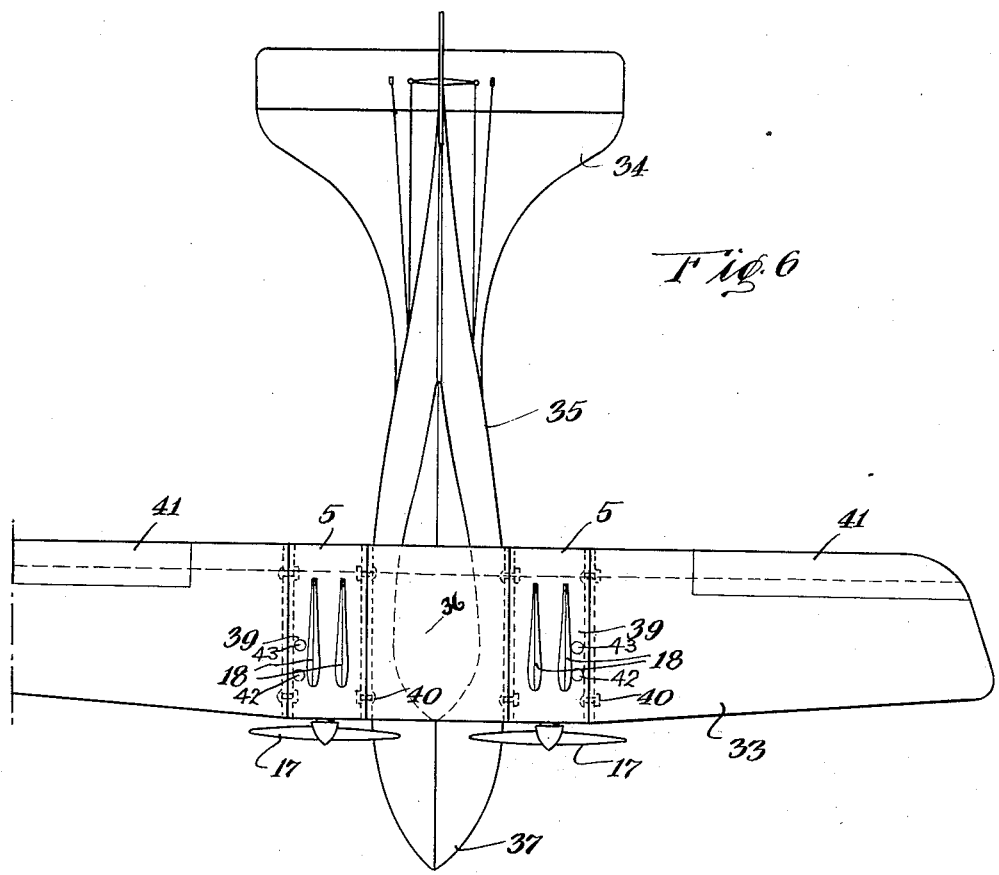
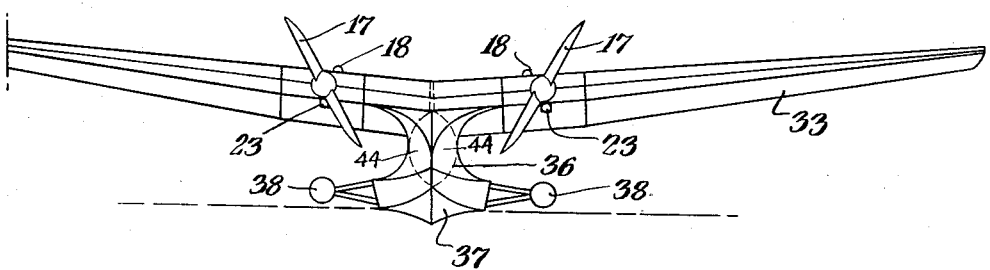
Inventor
William Harper, Jr.
By his Attorney Patented May 30, 1933

1,911,567

UNITED STATES PATENT OFFICE

WILLIAM HARPER, JR., OF PORT WASHINGTON, NEW YORK, ASSIGNOR TO SUPER-MARINE SYSTEMS, INC., OF NEW YORK, N. Y., A CORPORATION OF DELAWARE

AIRCRAFT PROPULSION

Application filed March 1, 1930. Serial No. 432,462.

This invention relates to aircraft propulsion and has for its principal object to provide a compact self-contained power plant utilizing motors which may be obtained cheaply in the open market, which may be mounted as a unit in aircraft of any standard construction, and is specially constructed to reduce common parasitic losses and increase the efficiency of the driving force as well as the stability of the craft in which it is used.

Another object of the invention is to provide centralized power plant, fuel supply and cooling mediums which are readily accessible for inspection and repair and are housed in a common panel adapted to be incorporated in the wings or other portion of an airplane without external bracing or other alteration in the construction of the craft itself.

Still further objects of the invention are to increase the efficiency of airplane motors by so directing the flow of inlet and exhaust gases that they are accelerated in proportion to the speed of the motor; to so construct an aerofoil that it is more automatically stable than previous designs in the prevention of sudden dives due to varying speeds either head down or tail down; and by simplifying the construction and installation of the power plant to reduce the number of parts in an airplane with resulting economy in the overall cost of production.

An important feature of the invention resides in a power plant for aerofoils comprising a combustion engine having its outer heat radiating surface forming a part of the contour of the aerofoil. An important advantage of this construction is that the reaction of the slip stream from the propeller exerts a direct lift on the engine, thus eliminating the parasitic resistance offered by the engine in previous aircraft construction.

In carrying out the invention I prefer to consolidate a complete power plant including motor, fuel supply, heat radiating surfaces and cooling mediums in a compact housing of the same contour as an aerofoil and designed to fit into the aerofoil as a panel section which strengthens the structure and enables it to carry the weight of the plant without external bracing. The size and weight of this panel may be minimized by employing a light high-speed motor with a reduction gear to obtain proficient propeller speeds, and by employing a special combined air and water cooling system which eliminates all piping, pumps and radiator and utilizes the essential metallic structure of the motor as a heat radiating and conveying medium both to the cooling fluid and the air-cooled surface of the aerofoil.

The inlet and exhaust for the completely housed motor structure are so arranged that the slip stream of the propeller assists the flow of both inlet and exhaust gases, and I also arrange the exhaust manifold so that any heat developed in the power plant or from burning or leaking gasoline is swept clear of any inflammable material by the slip stream of the propeller or the air currents from the aerofoil. By this arrangement of exhaust inlet and outlet, furthermore, the noise from the power plant is muffled and isolated away from the amplifying surface of an airplane. The assembly of motor, fuel supply and cooling medium in a self-contained panel which may form part of the wings, for example, also keeps all inflammable fuel out of the fuselage and away from the passengers. The arrangement of the fuel and liquid cooling medium in the same panel in contact with the metal forming a large part of the structure results in dampening engine vibrations and preventing detrimental vibrations from affecting other parts of the plane.

These and other features of the invention, including a novel construction of the trailing edge of the aerofoil to promote balance, will be described in connection with the accompanying drawings, in which:

Fig. 1 is a plan view of an aerofoil panel constructed in accordance with the invention with top cover plate and exhaust manifold removed, and showing portions of the power plant in section;

Fig. 2 is a horizontal section illustrating the cooling system and the inlet and exhaust manifolds;

Fig. 3 is a plan view of the exhaust manifold illustrating its stream lining and Venturi action;

Figs. 4 and 5 are fragmentary plan and side views, respectively, of the trailing edge of a rib of the aerofoil; and Figs. 6 and 7 are plan and front views, respectively, of a hydro-airplane with power plant panels inserted in the wings.

The complete panel shown in Figs. 1 and 2 comprises a forward section 1 containing the motor 2, an intermediate section 3 containing fuel supply tanks 4, and a rear section 5 which constitutes the leaving or trailing edge of the aerofoil. In small sizes incorporating from thirty to forty horsepower the complete panel measures approximately 72 inches in length by 20 inches in width.

The motor 2 is a conventional two-cycle, four-cylinder opposed motor of the type commonly employed in outboard motor boats and may be obtained cheaply in the open market. The usual water equipment and cylinder heads are removed from the motor and the cylinder unit with crank shaft 6 and fly wheel or generator 7 is bolted into the panel section 1 by means of cylinder head bolts 8. The cylinder heads themselves are machined into the respective right and left-hand casings or castings 9 and 10 which are bolted together through bolt holes 11. These castings are so constructed and cored hollow with suitable bracers and radiating fins 12 that the cooling medium such as water, or any of the other more efficient substitutes, readily circulates through the coring about the respective cylinder heads. This system includes core passages 13, a plurality of openings 14 in the radiating fins 12, and water coreports 15 at the juncture of the cylinder barrels proper with the cylinder heads, so that the cooling medium circulates readily under the thermal siphon system. At the front end of the crank shaft 6 is an internal reduction gear 16 connected to the propeller 17, so that light weight may be attained by using a high-speed motor turning the propeller at an efficient propeller speed.

A large exhaust manifold 18 is attached to each pair of cylinders, and is formed externally on the air stream line principle and so constructed internally by means of baffle plate 19 that the alternate exhausts from cylinders 20 and 21 assist each other by means of the alternate exhaust gas momentum velocities. Consequently, one exhaust manifold is arranged above each pair of cylinders, requiring two exhaust manifolds per power unit. A set of louvers 22 are cut into the cheek of the exhaust manifold 18 on either side thereof to admit cooling air into the hot exhaust stream at a section of the exhaust manifold where the Venturi throat action is sufficient for such purpose. A smaller manifold 23 constitutes the inlet of the carburetor and distributing valve for the various cylinders. This is so placed on the under part of the aerofoil that it receives air under high velocity from the propeller and increased pressure from the compression surface of the aerofoil. The exhaust is ejected at 24 which is in the vacuum area of the leaving upper surface of the main aerofoil and in the high velocity slip stream from the propeller. It will be seen that the fuel supply tanks 4 are insulated from any direct heat from the engine by means of an interposed water jacketing of core passage 13, thus eliminating any lengthy system of fuel piping which invariably causes breakage and fire hazards. Removable cover plates 25 facilitate assembly of the motor and permit ready inspection or repair. These plates cover a more or less rectangular space in the center of the motor compartment which is not water-jacketed.

Figs. 4 and 5 illustrate the construction of the leaving edge of a rib 27 of the rear panel section 5. This panel section consists of a more or less rigid metallic structure and covering up to the point 28. From there on to its tip it is flexible to the extent that when unloaded the leaving edge assumes the position illustrated by dotted lines 29, the upper and lower rib sections being joined by a slip bolt and slot connection 30. Under normal flying speeds or pressures its position is as illustrated in full lines at 31, but when the head speed has been reduced below the safety point the increased pressure on the after-section of the aerofoil will cause the leaving edge to be pressed into the position illustrated by dotted lines 32. This upward curving of the leaving edge of the aerofoil develops a go-ahead thrust which produces a head speed making the elevator control more effective.

Figs. 6 and 7 show my self-contained power panel applied to a hydro-airplane of standard construction comprising main and tail wings 33 and 34, respectively, the fuselage 35 having transparent panels and door openings 44 partly surrounding passenger compartment 36, and the boat portion 37 having suitable pontoons 38. Panels 44 by their construction form graceful stream-line curves joining the top sides of the boat hull to the plane surface. In the aircraft here shown, I provide two self-contained power panels indicated generally at 39, constituting panel sections fitted into the main wing 33 on opposite sides of the fuselage by means of suitable bolts 40 and coinciding with the surface of the wing as shown. According to my invention, the entire leaving edge of the main wing 33 coextensive with the leaving edge 5 of the panels 39, is also made flexible as previously described, such flexible edge extending through the ailerons 41. It will be seen that the panels 39 are completely isolated in the main wing, keeping all inflammable fuel away from the passengers, dampening and isolating engine vibrations, and directing the heat of the engine and the exhaust clear of any inflammable material by means of the slip stream of the propeller and air currents from the aerofoil. Also, inasmuch as the outer cooling surface of the engine constitutes a composite section or continuation of the main wing, the reaction of the slip stream from the propeller exerts a direct lift on the engine and thus eliminates the parasitic resistance offered by the engine in previous aircraft construction.

Fig. 1 shows the arrangement of spark plugs which are accessible through doors which may be provided to cover the spaces adjacent said spark plugs. In Fig. 6 I have illustrated filling plugs and relief valves 42 for the water system, and fuel filler caps 43 for the fuel tanks.

Although I have illustrated a horizontal opposed two-cycle engine, I do not restrict myself to such construction but may use any other type such as a vertical two-cycle or four-cycle engine. Neither do I restrict myself to water cooling since in some cases air cooling alone may be sufficient. Also, I may use any number of panels.

Various other changes may also be made in the details of construction herein shown and described without departing from the scope and spirit of the invention as defined by the appended claims.

The invention claimed is:

1. In an airplane, an aerofoil, a combustion engine in said aerofoil and a propeller driven thereby, said engine having its outer surface constituting a part of the outer surface of said aerofoil whereby the reaction of the slip stream from said propeller exerts a direct lift on said engine.

2. A self-contained power plant for aerofoils comprising a housing containing a combustion engine having its outer heat radiating surface forming a part of the contour of the aerofoil.

3. A self-contained power plant for aerofoils comprising a housing containing a combustion engine, and a propeller driven thereby, said engine having an outer heat radiating surface forming a part of the contour of the aerofoil and exposed to the slip stream of the propeller, and a chamber for cooling fluid between said heat radiating surface and the engine cylinders.

4. A self-contained power plant for aerofoils comprising a housing containing a combustion engine having the greater part of its outer heat radiating surface coincident with the surface of the aerofoil, a chamber for cooling fluid between said heat radiating surface and the engine cylinders, and a fuel supply tank in close proximity to said chamber and insulated thereby from the direct heat of the engine.

5. An airplane comprising a front wing containing a panel section housing a combustion engine, a propeller driven by said engine, a hollow chamber for cooling fluid surrounding said engine and having the greater part of its outer heat radiating surface coincident with the surface of said wing and exposed to the slip stream of the propeller, a fuel supply tank in said panel section in close proximity to said chamber and insulated thereby from the direct heat of the engine, and a fuselage containing an enclosed passenger compartment having side panels forming streamline curves joining said compartment to the under surface of said wing.

6. A self-contained power plant for aircraft comprising a housing, a combustion engine having opposed cylinder heads formed in said housing, and means on said housing forming passages for cooling fluid surrounding the engine and having outer heat radiating surfaces exposed to air currents.

7. A self-contained power plant for aircraft comprising a housing having connected sections, a combustion engine having cylinder units secured to said sections, fins on said sections forming connected passages surrounding the engine and having outer heat radiating surfaces exposed to air currents, and means for circulating a cooling fluid in said passages.

8. A self-contained power plant for aircraft comprising connected casings, a combustion engine having opposed cylinder heads formed in said casings, a cylinder unit including cylinder barrels, crank shaft and generator secured to said casings, and fins on said casings forming passages for cooling fluid surrounding the engine and having outer heat radiating surfaces exposed to air currents and forming a part of the outer surface of the aircraft.

9. A self-contained power plant for aircraft comprising connected casings, a combustion engine having opposed cylinder heads formed in said casings, a cylinder unit including cylinder barrels, crank shaft and generator secured to said casings, radiating fins on said casings forming passages for cooling fluid surrounding the engine and having outer heat radiating surfaces exposed to air currents, and a fuel supply tank in close proximity to said passages and insulated thereby from the direct heat of the engine.

10. A self-contained power plant for aircraft comprising an aerofoil containing an opposed four-cylinder combustion engine, a propeller driven thereby, separate exhaust manifolds arranged above each pair of cylinders and having discharge openings in the high velocity slip stream of the propeller, and a baffle plate in each manifold between the cylinders enabling the exhausts from said cylinders to assist each other by means of the alternate exhaust gas momentum velocities.

11. A self-contained power plant for aerofoils comprising a panel shaped to fit into and conform to the contour of the aerofoil, a horizontal opposed cylinder combustion engine in said panel, a propeller driven thereby, and a hollow chamber for cooling fluid forming part of said engine and having its outer heat radiating surface exposed to the slip stream of the propeller.

12. A self-contained power plant for aerofoils comprising a housing containing a combustion engine, a chamber for cooling fluid forming part of said engine having its outer heat radiating surface conforming to the contour of the aerofoil and exposed to air currents, and a propeller driven by said engine and arranged to direct its slip stream over the aerofoil at an efficient lifting angle.

13. In an airplane, an aerofoil containing a combustion engine, a chamber for cooling fluid forming a part of said engine and having an outer surface conforming to the contour of said aerofoil, and a cooling fluid in said chamber having a dampening effect isolating engine vibrations from the body of said aerofoil.

Signed at New York in the county of New York and State of New York this 28th day of February A.D. 1930.

WILLIAM HARPER, Jr.